Sept. 29, 1970 A. W. SAY 3,531,128

RECORD STEADYING MEANS FOR RECORD CHANGERS

Filed April 18, 1968 4 Sheets-Sheet 1

Sept. 29, 1970 A. W. SAY 3,531,128

RECORD STEADYING MEANS FOR RECORD CHANGERS

Filed April 18, 1968 4 Sheets-Sheet 4

3,531,128
Patented Sept. 29, 1970

3,531,128

RECORD STEADYING MEANS FOR RECORD CHANGERS

Alan William Say, Swindon, England, assignor to Gerrard Engineering Limited, Swindon, England, a British company Filed Apr. 18, 1968, Ser. No. 722,292
Claims priority, application Great Britain, Apr. 20, 1967, 18,114/67
Int. Cl. G11b *17/18*
U.S. Cl. 274—10 2 Claims

ABSTRACT OF THE DISCLOSURE

A retractable record-edge steady for a centre-spindle record changer comprises a withdrawable column whose upper end forms a support for the edge of the bottom record, and a hook-like pawl whose stem is guided in the column by having a tail co-operating with a guide pin in the column and by guide-cam surfaces of the tail and column, causing the pawl to travel upwardly in an outwardly withdrawn position, and move downwardly, when resting on the topmost record, along a more inwardly advanced line. The column can, after release of a latch, be depressed against a spring and locked in a retracted position, from which the column will rise again to its operative position when the latch is once more withdrawn.

This invention relates to record-steadying devices for Gramophone record changers and is an improvement in or modification of a device described in our co-pending patent application Ser. No. 621,187 (Pat. No. 3,489,418). In the said patent application there are described edge support means for supporting the edge of the lowermost record of a stack of records held on a shouldered centre spindle of an automatic record changer, the edge support means being provided with a clamping element effective for slightly urging the stack of records downwardly onto an edge-support shelf and including a hook-like element adapted to rest on the topmost record of the stack and guided to move downward along a path in which said hook-like member overhangs the records, to move outwardly at the end of the downward movement, then to move upward along a second path outside the edges of the records in such stack, and to return at the end of such upward movement to the above-mentioned overhanging position for a further downward movement. In the construction described and illustrated the record support was fixed relative to the base plate of the Gramophone record changer, and the clamping element was guidingly supported from the base plate, one of the guides being a bell-crank lever pivoted in the base independently of said support.

Figure 3:
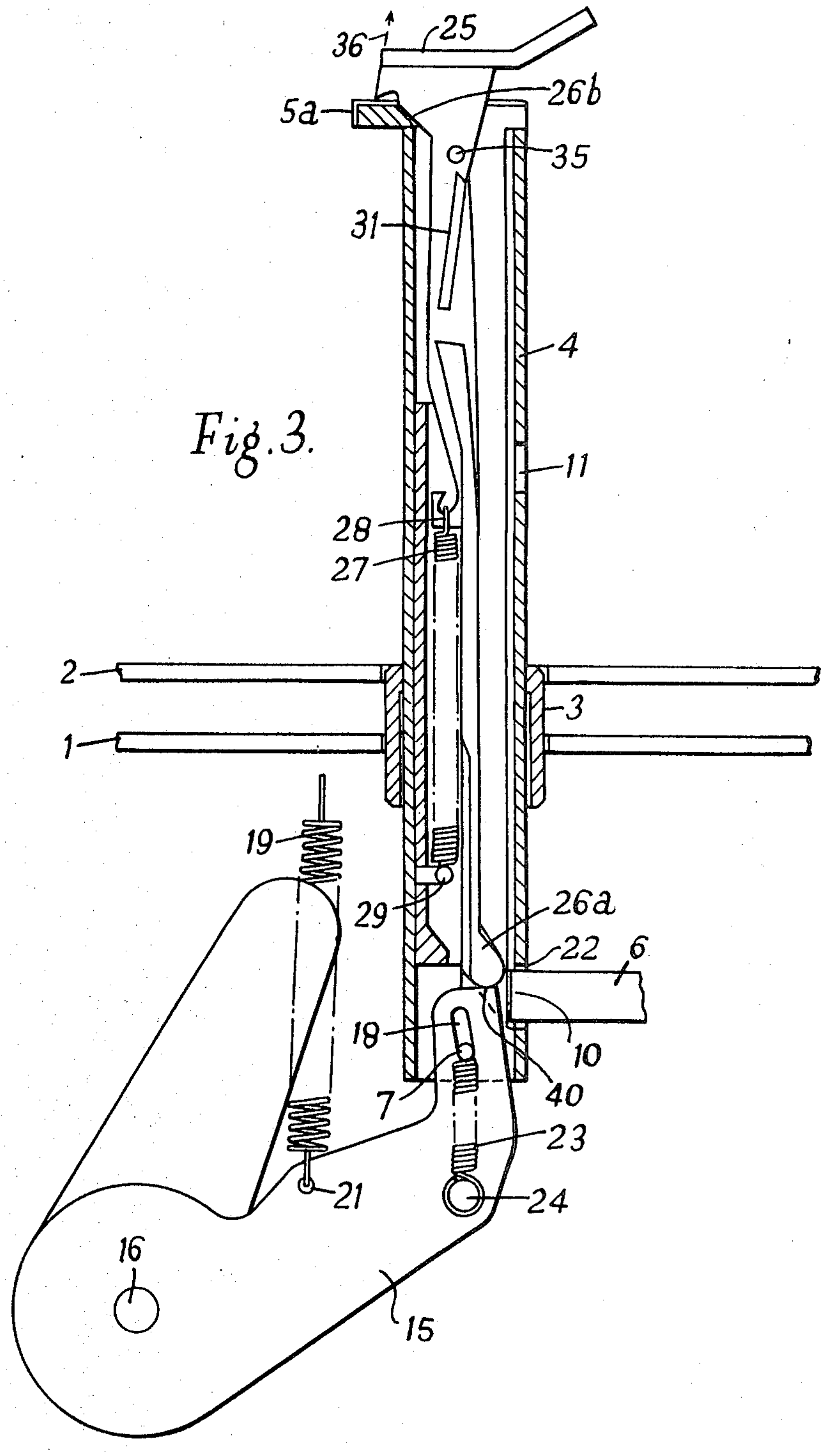
Figure 4:
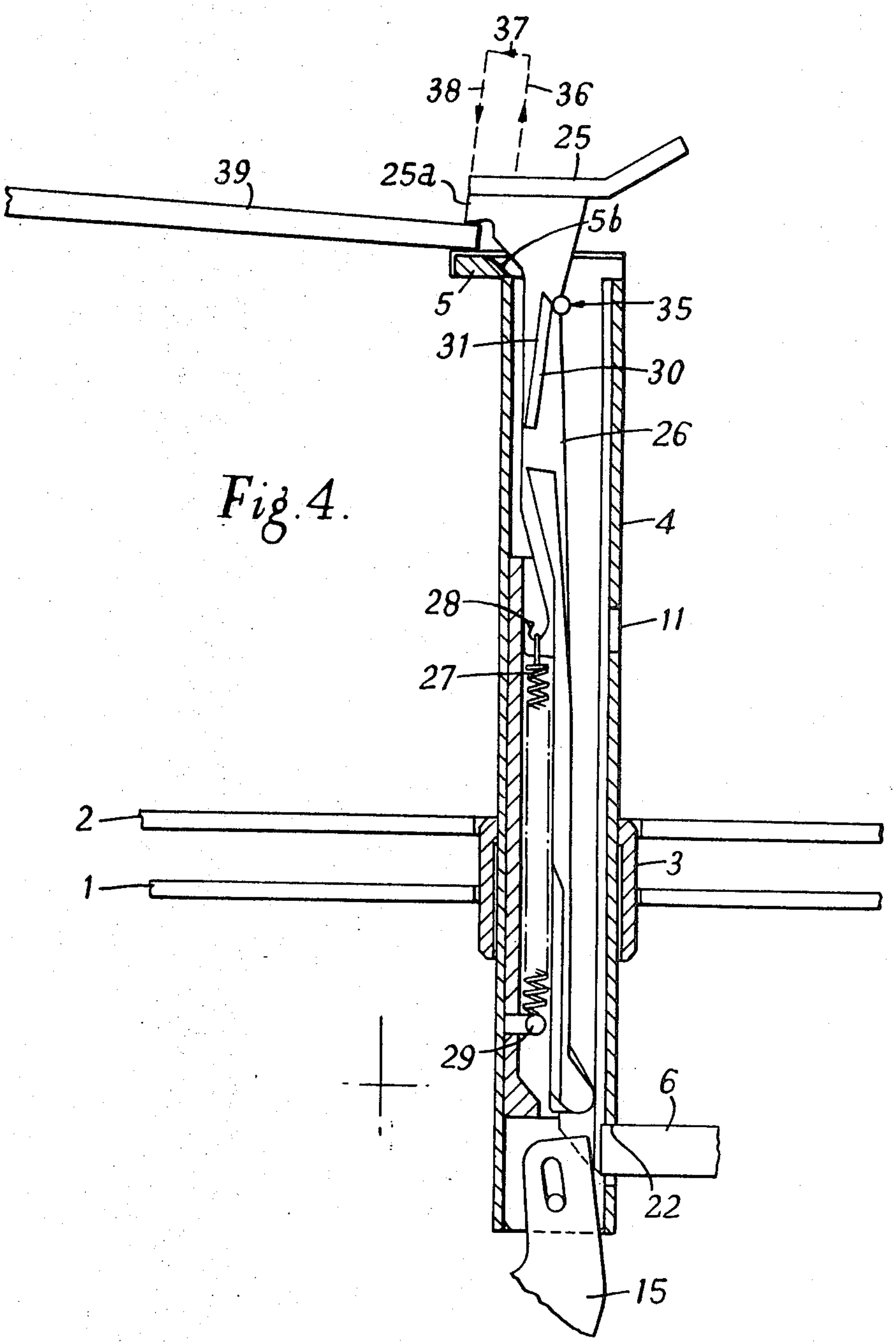
Figure 5:
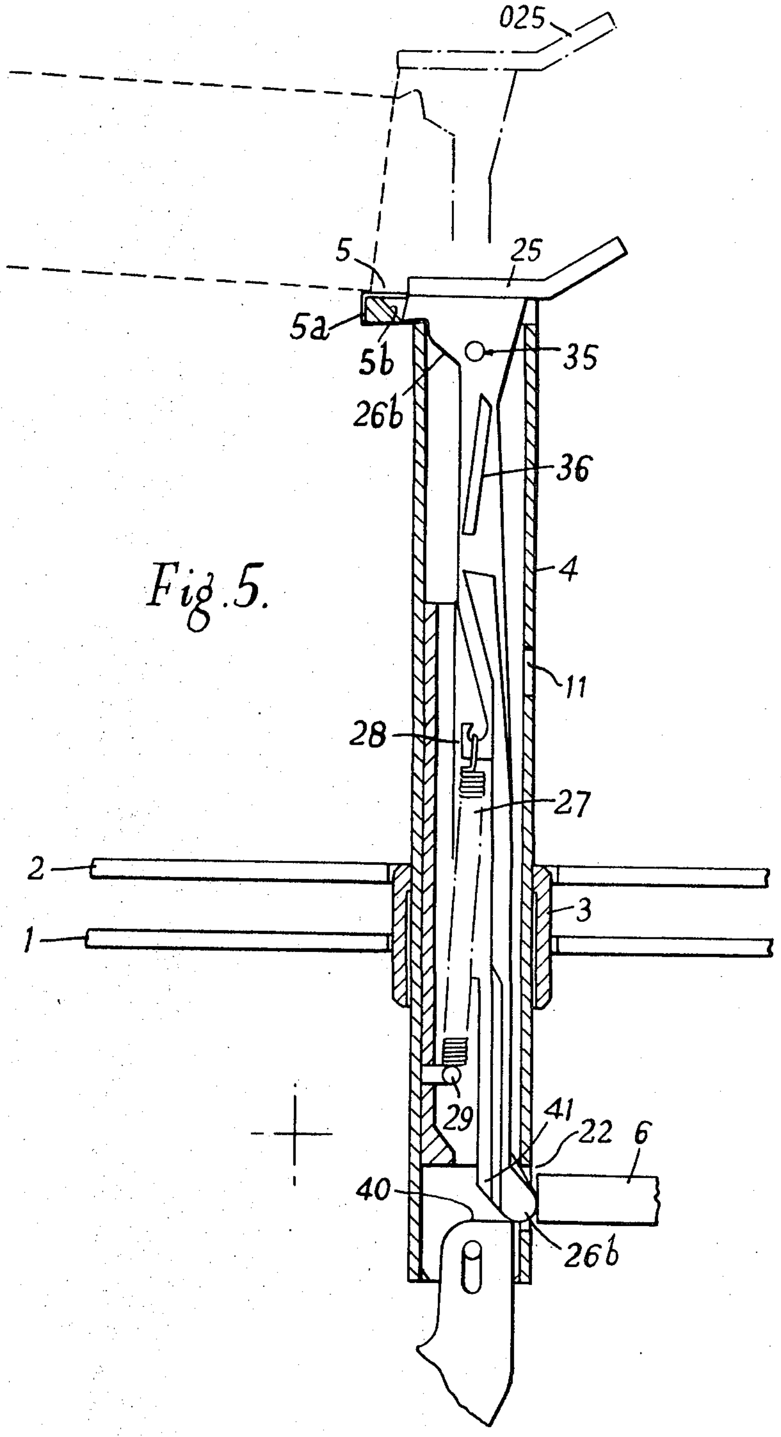

The present invention has for an object to provide a combined record support and clamp device according to the main patent, which is adapted to be bodily lowered through the base plate of the Gramophone so as to permit, preferably after replacement of the magazine-type record-changer centre spindle by a short, plain centre spindle, use of the record changer as a transcription unit not appreciably obstructed by the presence of edge-support means. According to the invention the guide means of such clamping element are arranged in a vertical column whose upper end forms the edge support, and which is guided in the base of a record player or changer for movement against spring means from a normal operative position at which the height of the edge support corresponds to the height of the shoulder in the record changer spindle, to an inoperative position, in which the edge-support surface projects a little over the top surface of the player-unit base, releasable locking means being provided for retaining the column selectively in its operative and inoperative positions. Preferably a locking member is arranged underneath the base plate of the player unit and is resiliently urged into engagement with locking recesses in the column, a suitable mechanism, for example a press-button mechanism being provided for temporarily withdrawing the locking member from such recesses to allow movement of the column from the operative to the inoperative position and vice versa. A spring urging the column to its operative position may, if desired, be arranged to act on a pivoted lever suitably coupled with the column, and this lever may be fixed on a rotatable shaft extending through one of the lateral walls of the player housing, thus permitting the column to be retracted by rotation of the spindle if desired. One embodiment of the invention is illustrated in the accompanying drawings in which FIG. 1 is a part-elevation of a player unit equipped with one form of record-steadying means according to the invention, in a section through the centre line of the edge-support column, the column being shown in its inoperative, retracted position, FIG. 2 is a plan view of the locking mechanism, FIG. 3 is an elevation similar to FIG. 1, showing the column in its operative position in the absence of a record, FIG. 4 is a similar view showing the column in its operative position with the edge of one record resting on the support and steadied by the clamping jaw, the path of movement of the clamping jaw being indicated by a broken line, and FIG. 5 shows the column with the steadying clamp lowered to permit subsequent lowering of the column by further pressure on the claw without the need of opening the press button for releasing the lock.

Figures 1, 2:
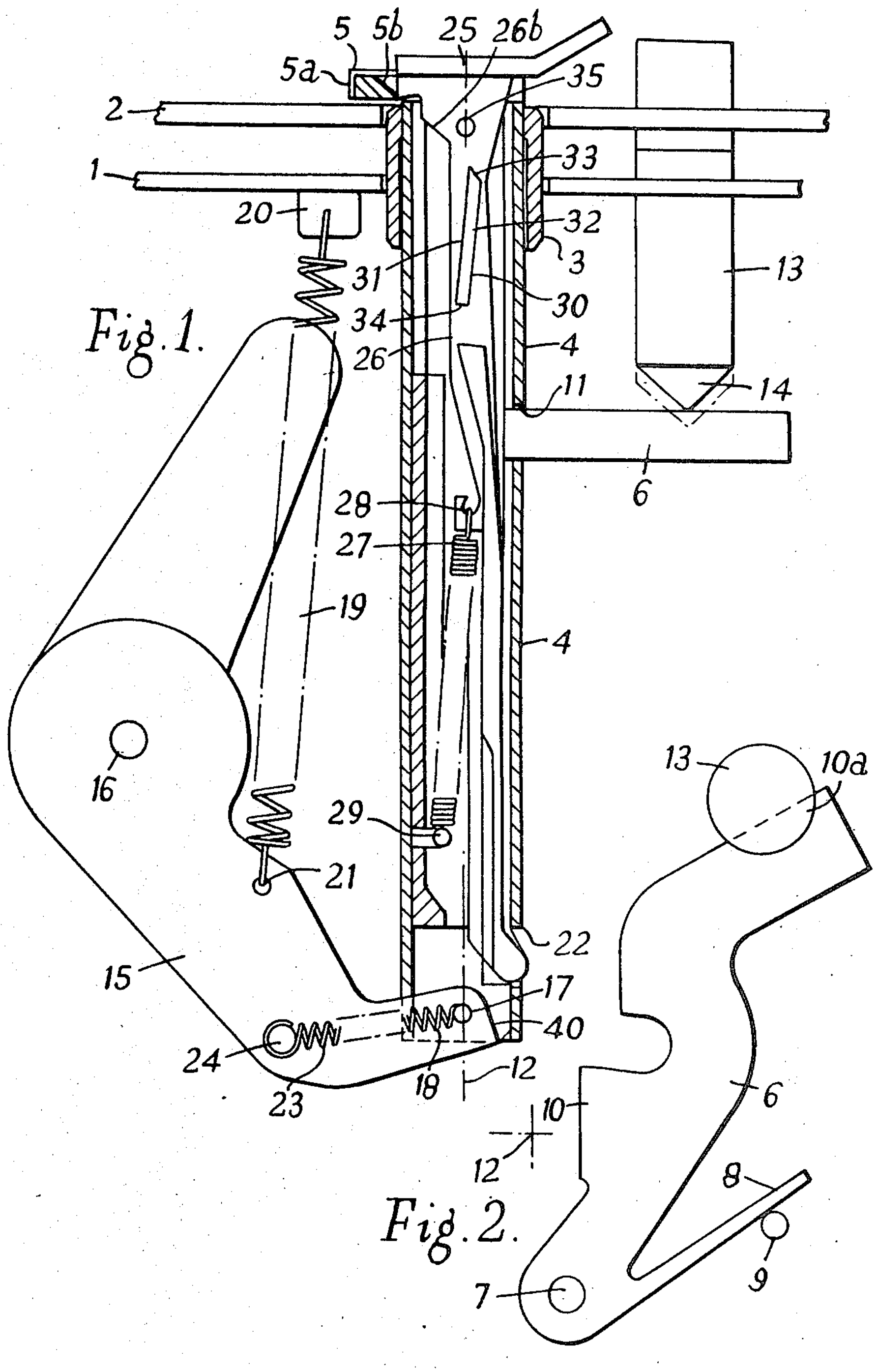

Referring now first to FIG. 1, which shows the invention applied to a record player which can be alternatively used as a transcription unit for playing single records or as a record changer for sequentially playing records from a stack carried at the top of a magazine spindle, the player has a unit plate 1, to the underside of which a turntable drive and actuating mechanism for automatic record-changing operation are suspended in any conventional or convenient manner, and the upper side of which is shrouded by a player-unit base moulding 2. A steady-column guide bush 3 is mounted to extend vertically through the unit plate 1 and base moulding 2, and vertically slidable in the bush 3 is a support column 4 formed at its upper end with a record-edge support platform 5. This column 4 is shown in its retracted position, in which the underside of the support platform 5 is almost in contact with the base moulding 2, and a locking or index lever 6, which is shown in plan view in FIG. 2, is pivotally mounted on the unit plate 1 for movement about an axis 7 while being prevented from movement towards and away from the unit plate. It is equipped with a leaf spring 8, which may be formed integral with the lever 6, and which rests under resilient tension against a pin 9, shown in FIG. 2 only, which extends from the lower side of the unit plate 1. The spring 8 urges a locking edge 10 of the lever 6 into engagement with a slot 11 formed in the wall of the support column 4. This column is assumed to have circular cross section, with its axis shown at 12 in FIG. 2, while the lever 6 has a further edge portion 10*a* co-operating with the tapered end 14 of a press button 13. This press button is guided for vertical movement relative to the unit plate and base moulding, so that depression of the button 13 will, by cam action of its tapered portion 14, swing the lever 6 to withdraw its locking edge 10 from the slot 11 of column 4. After release of the button, the action of the spring 8 tends to return the lever 6 to its locked position and, by the action of lever 6 upon the tapered portion 14, to raise the press button 13 back to its original position.

In order to cause the column 4 to automatically rise to its operative position upon depression of the press button 13, a column-support lever 15, which is pivoted in the player unit for movement about a horizontal axis 16, has its free end coupled to the column 4 by a cross-pin 17 of the latter which engages a slot 18 in the lever 15, and a tension spring 19 is interposed between a lug 20 of the unit plate 1 and a point 21 of the lever 15, and urges the lever 15 in a counterclockwise direction as seen in FIG. 1 for raising the column 4 by the engagement of the slot 18 with the pin 17. Accordingly brief depression of the button 13 will, by withdrawing the locking edge 10 of the lever 6 from the locking slot 11, allow the spring 19 to raise the column until the lever 6 comes to face a second slot 22 in the column wall, whereupon the spring 8 will cause the locking edge 10 of the lever 6 to enter this second slot 22 and thus to lock the column in the raised, operative position as illustrated in FIG. 3.

The slot 18 is so arranged in the column-support lever 15 as to extend substantially in the longitudinal direction of the column 4 when the lever 15 is in a position corresponding to the operative position of the column 4, and a small tension spring 23 is interposed between the pin 17 of column 4 and a stud 24 on the lever 15. As will be seen in FIG. 1, this spring becomes extended as, during the end of the downward movement of the column 4, its point 24 of attachment to the lever 15 moves, due to the pivotal movement of the lever 15, away from the centre line 12 of the column 4, and as a result the tension spring 23 assists the main spring 19 in applying an anti-clockwise torque to the lever 15 when the column 4 is in, or near, its fully retracted position. In order to hold the edges of the records down on the platform 5, a clamping claw 25 is provided, and this claw is equipped with a guiding tail portion 26 which extends inside the column 4 and is urged downwardly by a loading tension spring 27. One end of this loading spring 27 is hitched to the guiding tail 26 of claw 25 at a point 28, while its other end is anchored at 29 in the column 4. The guiding tail 26 is also equipped at one side, or at each side, with a cam rail 30. This rail has two parallel cam surfaces 31 and 32, inclined at an acute angle to the longitudinal direction of the column 4, and two end surfaces of which the upper end surface 33 is inclined to the surfaces 31 and 32 at an acute angle to form a knife edge at its intersection with surface 31 while the other end surface 34 is perpendicular to the surfaces 31 and 32. A pin, or two aligned pins, 35 extend into the column 4 in a direction parallel to the above-mentioned knife edge and is or are so positioned in relation thereto that when the claw 25 with its tails 26 is manually raised, the pin 35 will engage the surface 31, which will force the claw 25 to rise with the leading edge **25*a* of the claw following a path which, as indicated by line 36 in FIGS. 3 and 4, is well set back from the front edge 5*a* of the platform, that is to say from that edge which faces the centre of the turntable. When the claw 25 has been raised above the maximum height of the stack for which the player is intended, the pin 35 will pass across the lower end of the guide rail 30, thus allowing the spring 27 to move the tail 26 of the claw 25 towards the centre of the record as indicated by the line 37 in FIG. 4, so that during the subsequent downward movement of the claw under the action of spring 27, when the pin 35 engages the opposite surface 32 of the bar 30, the end 25*a* of the pawl 25 will move downward along the line 38 of FIG. 4, thus coming to rest on the topmost record of the stack. The pawl 25 will then descend with this topmost record until, as shown in FIG. 4, the topmost record 39 is the only record remaining in the stack, each preceding record having successively been allowed to be withdrawn from the platform 5 by the usual ejection movement of the centre spindle mechanism, which causes the centre hole of the record to move off a shelf on the centre spindle. When finally the last record 39 of the stack leaves the platform 5, the claw 25 and its tail 26 move low enough for the pin 35 to allow the pawl 25** to move outwardly again to resume the position illustrated in FIG. 3.

In order to ensure that after release of the last record 39 the front edge **25*a* of the pawl 25 is withdrawn from the front edge 5*a* of the platform 5 as indicated in FIG. 5, the tail 26 of the claw 25 is formed with an inclined cam edge 26*b* which co-operates with the inclined bottom of a recess 5*b* in the platform 5 in forcing the pawl 25 to perform the last portion of its downward movement in a direction inclined to the longitudinal direction of the column 4 in accordance with the inclination of the cam edge 26*b***.

In order to avoid, when it is desired to move the column 4 to its retracted position, the necessity of operating the press-button 13 at the same time at which downward pressure is exerted on the pawl 25, the tail 26 is made sufficiently long for its lower end to reach the second slot 22 of the column 4, and the end of the tail 26 is made with a nose **26*a* which projects to the right of FIG. 3 and which, when the column 4 is in its operative position, rests on an end surface 40 of the lever 15 and can be moved further downwardly to a limited extent by manually depressing the pawl 25 with sufficient force to overcome the action on the surface 40 of the springs 19 and 23. Furthermore the column 4 is provided with an inclined cam surface 41, FIG. 5, with which the lower end portion of the tail 26 co-operates during this further downward movement of the pawl 25, so that the nose 26*a* will act on the locking edge 10 of the locking lever 6 to force this edge out of the slot 22, whereafter further pressure on the pawl 25 will cause the column 4 to move downwardly with the pawl until the locking edge 10 of the lever 6 engages the upper slot 11 of the column 4. This operation of the pawl 25 for withdrawing the locking lever 6 from the slot 22 is best illustrated in FIG. 5, in which also the raised position of the pawl 25 when resting on a maximum stack of records is illustrated in chain-dotted lines at 025**.

It will be appreciated that once the locking edge 10 of the locking lever 6 has been forced out of the slot 22 and the column 4 is therefore free to move downwardly, the combined action of the tension springs 19 and 23 will raise the end 40 of lever 15 again relative to column 4 to that position in which the pin 17 rests at the lower end of the slot 18, and that accordingly when, after the next depression of the trigger button 13, the column rises again and reaches the position for engagement of the locking lever 6 with the slot 22, co-operation between the end 40 of the lever 15 and the portion **26*b* of the tail of the pawl 25 will move nose 26*a* of the tail portion upwardly in the column 4 to a sufficient extent to allow the locking action of the lever 6** as illustrated in FIG. 3.

What we claim is:

1. In a Gramophone record changer having a base and a center spindle formed with a shoulder, a record-steadying device which comprises a hollow vertical column having at its upper end a record support platform for supporting the edge of the lowermost record of a stack of records held on said center spindle shoulder; means for mounting said column on said base for the longitudinal displacement thereof between a first position in which the upper surface of said platform corresponds in height to said center spindle shoulder and a second position in which said platform is in close proximity to said base; a hook-shaped clamping element; first bias means extending between said column and said clamping element for urging said clamping element to rest on, and move downwardly with, the topmost record of said stack of records, said clamping element having a stem extending downwardly into said hollow column; guide means formed from said clamping element stem and said column for guiding the displacement of said clamping element relative to said column from a predetermined position downward along a path in which said clamping element overhangs such records, then to move outward at the end of the downward movement, then to move upward along a second path outside of the edges of the records in such stack, and to return at the end of such upward movement to said first position; said column being formed with at least two longitudinally spaced locking recesses, a locking member disposed beneath said base adjacent said column; second bias means urging said locking member into said locking recesses to retain said column at each of said first and second positions; a pivoted lever coupled with said column; third bias means acting on said lever to bias said column toward said first position; and press-button means for temporarily withdrawing said locking member from a locking recess to permit longitudinal displacement of said column.

2. A Gramophone record changer as claimed in claim 1, wherein said guide means includes a cam rail formed on said clamping element stem and having a first and second cam surface respectively parallel to each other and inclined at an acute angle to the longitudinal axis of said column, an upper end surface inclined to said parallel first and second cam surfaces at an acute angle to define a knife edge at the intersection between said first cam surface and said upper end surface, and a second end surface extending perpendicular to said first and second cam surfaces; said guide means further including a pin formed within said hollow column and extending in a direction parallel to said knife edge for cooperation with said cam rail, said clamping member and said record support platform both having front edges disposed adjacent said stack of records, said pin cooperating with said cam rail first cam surface to hold said clamping member front edge set back from said record support platform front edge until said clamping element is raised above the maximum height of the stack of records for which said record changer is intended.

References Cited

UNITED STATES PATENTS

| | | | |
|---|---|---|---|
| 3,207,518 | 9/1965 | Henry | 274—10 |
| 3,408,081 | 10/1968 | Dennis | 274—10 |
| 3,512,701 | 6/1950 | Weaver | 274—10 |

LEONARD FORMAN, Primary Examiner

S. L. STEPHAN, Assistant Examiner